US009059601B2

(12) United States Patent
Rogers

(10) Patent No.: US 9,059,601 B2
(45) Date of Patent: Jun. 16, 2015

(54) WIND-DRIVEN RECHARGER FOR VEHICLE BATTERY

(76) Inventor: Richard Rogers, New Prague, MN (US)

( * ) Notice: Subject to any disclaimer, the term of this patent is extended or adjusted under 35 U.S.C. 154(b) by 695 days.

(21) Appl. No.: 12/825,890

(22) Filed: Jun. 29, 2010

(65) Prior Publication Data

US 2011/0316470 A1    Dec. 29, 2011

(51) Int. Cl.
| | |
|---|---|
| *F03D 9/00* | (2006.01) |
| *H02J 7/14* | (2006.01) |
| *B60L 8/00* | (2006.01) |
| *B60L 11/18* | (2006.01) |

(52) U.S. Cl.
CPC .............. *H02J 7/1415* (2013.01); *F03D 9/002* (2013.01); *F05B 2240/941* (2013.01); *H02J 2007/143* (2013.01); *Y02T 10/7005* (2013.01); *Y02E 10/725* (2013.01); *B60L 8/006* (2013.01); *B60L 11/1803* (2013.01); *B60L 2210/30* (2013.01); *B60L 2240/12* (2013.01); *Y02T 10/7241* (2013.01); *Y02T 10/7083* (2013.01)

(58) Field of Classification Search
USPC ............................ 290/44, 43, 54, 55; 180/2.2
See application file for complete search history.

(56) References Cited

U.S. PATENT DOCUMENTS

| | | | | |
|---|---|---|---|---|
| 3,538,361 | A | * | 11/1970 | Haut et al. .................. 310/68 R |
| 3,713,503 | A | * | 1/1973 | Haan .............................. 180/2.2 |
| 3,876,925 | A | | 4/1975 | Stoeckert |
| 4,179,007 | A | | 12/1979 | Howe |
| 5,280,827 | A | | 1/1994 | Taylor et al. |
| 5,296,746 | A | | 3/1994 | Burkhardt |
| 5,631,544 | A | | 5/1997 | Syverson et al. |
| 5,863,180 | A | | 1/1999 | Townsend |
| 5,917,304 | A | * | 6/1999 | Bird .............................. 320/101 |
| 5,920,127 | A | | 7/1999 | Damron et al. |
| 5,986,429 | A | | 11/1999 | Mula, Jr. |
| 6,138,781 | A | | 10/2000 | Hakala |
| 6,400,125 | B1 | * | 6/2002 | Pierret et al. .................... 322/29 |
| 6,897,575 | B1 | | 5/2005 | Yu |
| 7,434,636 | B2 | | 10/2008 | Sutherland |
| 7,445,064 | B2 | | 11/2008 | Kim |

(Continued)

FOREIGN PATENT DOCUMENTS

WO    2009149769 A2    12/2009

OTHER PUBLICATIONS

PA Performance, "High Output Alternators and Starters," 1 page, prior to Jun. 29, 2010.

(Continued)

*Primary Examiner* — Vanessa Girardi
(74) *Attorney, Agent, or Firm* — Seager Tufte & Wickhem LLC

(57) ABSTRACT

In one illustrative embodiment, a wind-driven charging system includes a wind-driven rotation device coupled to a rotatable shaft, and a plurality of electric generators disposed at different longitudinal locations along the rotatable shaft and each of the plurality of electric generators are rotationally driven simultaneously by the rotatable shaft. By having the electric generators disposed at different longitudinal locations, more electric generators may be simultaneously driven by a common shaft. In some instances, a controller may be configured to enable more of the electric generators to provide electrical current to recharge a battery when the speed of rotation of the rotatable shaft increases, and may disable more of the plurality of electric generators to not provide electrical current when the speed of rotation of the rotatable shaft decreases.

20 Claims, 8 Drawing Sheets

(56) References Cited

U.S. PATENT DOCUMENTS

| | | |
|---|---|---|
| 7,492,053 B2 | 2/2009 | Fein et al. |
| 7,498,684 B2 | 3/2009 | Fein et al. |
| 7,675,189 B2 * | 3/2010 | Grenier .......................... 290/54 |
| 2002/0153178 A1 | 10/2002 | Limonius |
| 2005/0046195 A1 | 3/2005 | Kousoulis |
| 2005/0280264 A1 * | 12/2005 | Nagy .............................. 290/55 |
| 2006/0113118 A1 | 6/2006 | Kim |
| 2006/0210400 A1 | 9/2006 | Hampl |
| 2006/0213697 A1 | 9/2006 | Sutherland |
| 2006/0273596 A1 | 12/2006 | Durbin |
| 2007/0107949 A1 | 5/2007 | Bradley et al. |
| 2007/0108775 A1 | 5/2007 | McDavid, Jr. |
| 2007/0202976 A1 * | 8/2007 | Luedtke .......................... 474/70 |
| 2007/0262584 A1 * | 11/2007 | Lu .................................. 290/55 |
| 2008/0041643 A1 | 2/2008 | Khalife |
| 2008/0116759 A1 | 5/2008 | Lin |
| 2008/0238105 A1 | 10/2008 | Ortiz et al. |
| 2008/0272603 A1 | 11/2008 | Baca et al. |
| 2008/0283319 A1 | 11/2008 | Putnam |
| 2008/0286102 A1 | 11/2008 | Tomoyasu |
| 2008/0315827 A1 | 12/2008 | Massey |
| 2009/0189452 A1 | 7/2009 | Fein et al. |
| 2009/0200089 A1 | 8/2009 | Friedmann |
| 2010/0001531 A1 | 1/2010 | Kulde |

OTHER PUBLICATIONS

International Search Report for Corresponding Application No. PCT/US2011/042466 dated Jul. 27, 2012.

* cited by examiner

WIND-DRIVEN RECHARGER FOR VEHICLE BATTERY

FIELD

This invention relates generally to electrical charging and recharging devices and systems for vehicles.

BACKGROUND

To extend the driving range and/or efficiency of electric powered vehicles, charging systems have been devised to provide battery charging through wind driven generators as the vehicle is moving. What would be desirable, however, is an improved wind-driven recharging system.

SUMMARY

This invention relates generally to electrical charging and recharging devices and systems for vehicles. In one illustrative embodiment, a wind-driven charging system includes a wind-driven rotation device coupled to a rotatable shaft, and a plurality of electric generators disposed at different longitudinal locations along the rotatable shaft and each of the plurality of electric generators are rotationally driven simultaneously by the rotatable shaft. By having the electric generators disposed at different longitudinal locations, more electric generators may be simultaneously driven by a common shaft. In some instances, a controller may be configured to enable more of the electric generators to provide electrical current to recharge a battery when the speed of rotation of the rotatable shaft increases, and may disable more of the plurality of electric generators to not provide electrical current when the speed of rotation of the rotatable shaft decreases.

The above summary is not intended to describe each disclosed embodiment or every implementation of the invention.

BRIEF DESCRIPTION OF THE DRAWINGS

The invention may be more completely understood in consideration of the following detailed description of various embodiments of the invention in connection with the accompanying drawings, in which.

Figure 1:
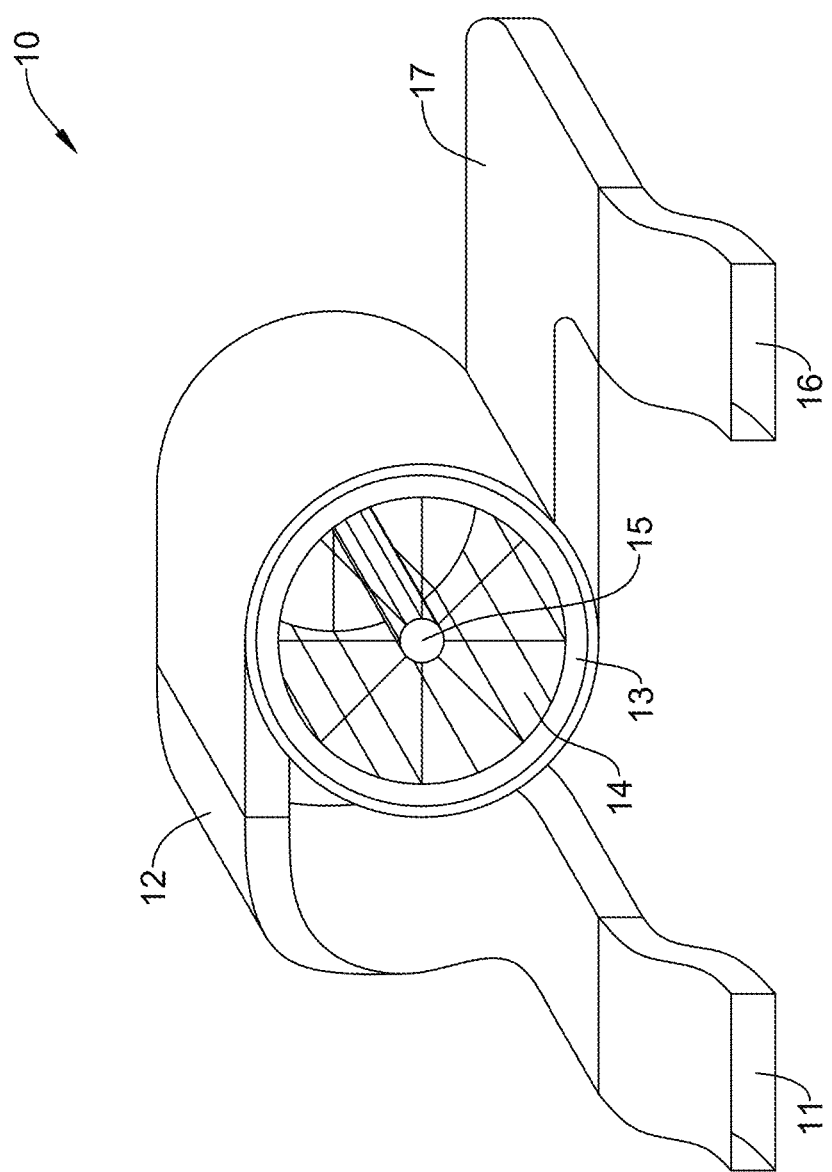
FIG. 1 is a perspective view showing an illustrative wind-driven rotation device.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.718, 3, 3.14159265, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings in which similar elements in different drawings are numbered the same. The drawings, which are not necessarily to scale, depict illustrative embodiments and are not intended to limit the scope of the invention.

The motion of a vehicle produces wind with respect to the vehicle body. Such wind may be harnessed to generate an electrical current that can be used to recharge one or more batteries on the vehicle. In one illustrative embodiment, the wind may be collected by one or more ducts that direct the wind to one or more blades on a turbine, which then rotates the turbine. The turbine, in turn, may be coupled to and rotate a rotatable shaft. In some instances, the rotatable shaft may drive multiple electric generators (e.g. alternators) so that when the rotatable shaft is rotated by the wind, the electric generators all rotate as well. In some instances, the electric generators may be alternators, but this is not required. In some cases, the alternators (or some other circuit) may include suitable rectifiers to convert the alternating current (AC) produced by the alternators to direct current (DC). The direct current from each of the alternators may be optionally collected and combined with each other, and may be directed to one or more batteries to recharge the batteries. In some cases, the direct current (or AC current) may be directed to an electric motor of the vehicle to directly drive the electric motor of the vehicle.

In some illustrative embodiments, the electric generators may be spaced apart longitudinally along the length of the rotatable shaft. In some cases, the electric generators are regularly spaced along the length of the rotatable shaft. In some cases, at least some of the electric generators may arranged collinear along a line parallel to but offset from the rotatable shaft. In some instances, there may be two are more sub-sets of electric generators situated along the rotatable shaft, with each sub-set being collinear along a line parallel to the rotatable shaft but offset from one another. In some cases, one sub-set of electric generators may be axially displaced with respect to another sub-set of electric generators. In other cases, one sub-set of electric generators may be axially coincident with another group of electric generators.

The preceding paragraph is merely meant to be a summary, and should not be construed as limiting in any way. A more detailed description appears in the text that follows and in the figures.

FIG. 1 is a perspective view showing an illustrative wind-driven rotation device 10. In the illustrative wind-driven rotation device 10, an opening or vent 11 is pointed toward the front of the vehicle. Wind from the vehicle's motion enters the vent 11. The vent 11 may be located behind or under the grill of the vehicle, may be on the top or along the sides of the vehicle, or may protrude through a hood of the vehicle. These are just some examples. Regardless of location, the vent 11 may capture a portion of the motion-generated wind.

Wind entering the vent 11 is directed by a suitable duct 12 into a turbine rotor 13. The air flow entering the rotor 13 may do so tangentially as shown. The incoming air strikes the blades 14 of the rotor 13 and causes the rotor 13 to rotate about its center line 15. In the illustrative design shown in FIG. 1, the air flow enters the rotor 13 at the top, traveling to the right, and causes the rotor 13 to turn clockwise. The blades 14 of the rotor may be inclined toward the incoming air, may be radial, or may be inclined away from the incoming air. The blades may be flat, or may optionally be curved toward or away from the incoming air. The illustrative design of FIG. 1 also includes a second vent 16 and second duct 17 that direct additional motion generated wind into the rotor 13, tangentially along the bottom edge of the rotor 13. Optionally, more than two vents and ducts may be used, as desired.

It is contemplated that the vents 11 and 16, and ducts 12 and 17, may be any suitable shape or take on any suitable configuration. For example, the vents 11 and 16, and/or ducts 12 and 17, may be rectangular, square, round, oval or any other suitable shape as desired. In some instances, the vents 11 and 16 and/or ducts 12 and 17 may take the form of a cone or other shaped spiral, which helps orient the incoming air into a vortex which may help increase the force applied to the blades 14 of the rotor 13.

In the illustrative embodiment, the air flow that enters the rotor 13 through the ducts 12 and 17 exits the rotor 13 through the front and/or rear openings. In the illustrative design shown in FIG. 1, the front and rear openings of the rotor face the viewer and face away from the viewer, respectively. In some cases, the rotor 13 design shown in FIG. 1 may be referred to as a "hamster wheel" or "squirrel cage" design. While a "hamster wheel" or "squirrel cage" design is shown in FIG. 1, it is contemplated that the wind-driven rotation device 10 may be of any suitable design. In some cases, the wind-driven rotation device 10 may optionally include one or more propellers and/or spiral propellers. In general, any suitable design for converting incoming wind energy into rotation of a rotatable shaft 24 may be used, as desired.

Figure 2:
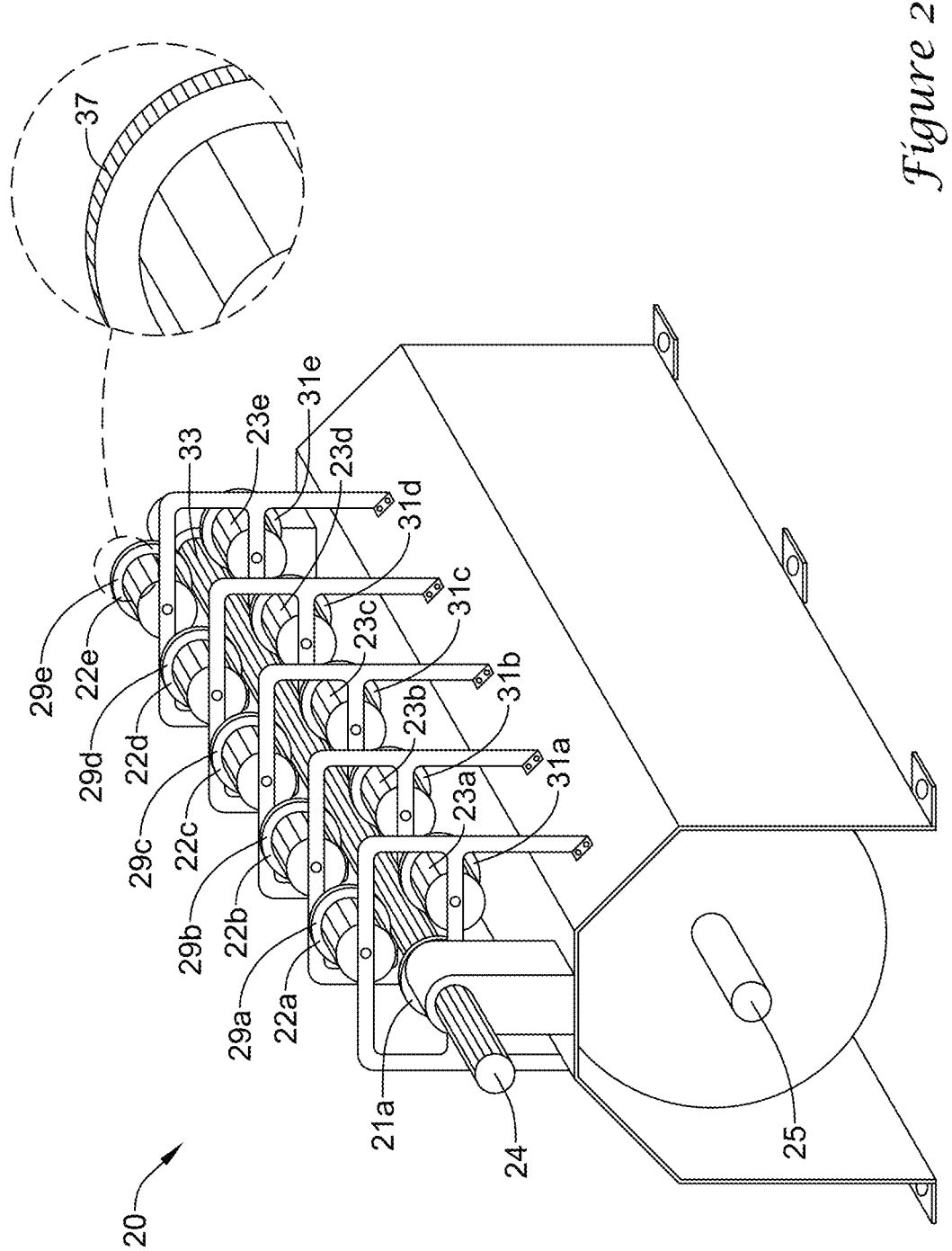
FIG. 2 is a perspective view of a frame that can support a rotatable shaft and a plurality of electric generators.

Turning now to FIG. 2, which shows a perspective view of a frame that can support a rotatable shaft 24 and a plurality of electric generators 21A, 22A-E and 23A-E. In the illustrative embodiment, the frame 20 supports a rotatable shaft 24, on which the wind-driven rotation device 10 of FIG. 1 may drive. In one illustrative embodiment, the rotatable shaft 24 may be collinear with the center line 15 of the wind-driven rotation device 10 of FIG. 1, so that when the turbine rotor 13 rotates, the rotatable shaft 24 also rotates. Such a direct coupling has a 1:1 correspondence between the rotation rate of the turbine rotor 13 and the rotatable shaft 24. However, it is contemplated that the wind-driven rotation device 10 may be mounted such that the rotation of the turbine rotor 13 may be coupled via a coupling 27 to the rotatable shaft 24 with a different correspondence between the rotation rate of the turbine rotor 13 and the rotatable shaft 24. For example, the wind-driven rotation device 10 may be mounted such that the turbine rotor 13 is coupled to the rotatable shaft 24 by one or more belts and/or gears 35a, 35b, which in some cases, may provide a 2:1, 3:1 or any other suitable ratio. It is contemplated that the rotation rates of the rotor 13 relative to the rotatable shaft 24 may be scaled up or down by using appropriate belting and/or gear sizes of an appropriate ratio, as desired.

The rotatable shaft 24 itself may be ridged to accommodate gears, or may be knurled, roughened or may include serrations 33 to reduce slippage with belts, wheels or other components that may engage the rotatable shaft 24. Optionally, ridges, knurls or serrations may extend over certain portions of the rotatable shaft 24. As a further option, one or more portions of the rotatable shaft 24 may be knurled, and one or more other portions of the rotatable shaft 24 may be ridged or may include serrations 33. These are just some examples.

Each electric generator may be driven be the rotatable shaft 24, so that when the rotatable shaft 24 is turned by the wind-driven rotation device 10, each electric generator is turned as well. In some cases, each electric generator may be coupled to the rotatable shaft 24 through, for example: (1) a belt wrapped around the rotatable shaft 24 and an exterior circumference of a pulley mounted to the input shaft of the electric generator; (2) a gear having gear teeth 37 mounted to the input shaft of the electric generator that engages corresponding ridges or teeth 33 formed in the rotatable shaft; (3) a friction fit between an exterior circumference of a wheel 29a-29e and 31a-31e mounted to the input shaft of the electric generator and an outer circumferential surface of the rotatable shaft. For (3), it is contemplated that the outer circumferential surface of the rotatable shaft 24 may include serrations 33 to help reduce slippage between the wheels 29a-29e and 31a-31e of the electric generators and the outer circumferential surface of the rotatable shaft 24. It must be recognized that these are just a few examples. It is contemplated that any suitable coupling may be used between the electric generators and the rotatable shaft 24.

The illustrative frame design shown in FIG. 2 includes three rows of electric generators (e.g. alternators) that are all driven by the rotatable shaft 24. In other embodiments, one, two, or more than three sets or sub-sets of electric generators may be used, as desired. In the illustrative embodiment, each row of electric generators, 21A (21B-E not being visible in this view), 22A-E and 23A-E, is mounted so that the corresponding electric generators are collinear or are nearly collinear along a line that is parallel or is nearly parallel to the rotatable shaft 24. Here, the term "nearly" is intended to accommodate typical manufacturing and assembly tolerances. For instance, a replacement part may be sized differently, and may extend farther in a particular direction than the part it replaces. Or, a part may be fastened to a hole adjacent to the hole intended for its mounting. In all of these cases, the electric generators may be said to be collinear or nearly collinear.

The illustrative frame design shown in FIG. 2 shows five electric generators in each row. Alternatively, one, two, at least two, three, at least three, four, at least four, at least five, six, or more than six electric generators may be used in each row, as desired. The number of electric generators in each row may be increased as needed, by lengthening the rotatable shaft 24 and the frame 20, as necessary. In general, a large number of electric generators may be used, because the combined output recharge current of relatively many electric generators may, in some cases, be greater than that of relatively fewer electric generators or of a single electric generator.

The illustrative frame 20 is shown mounted to an electric motor. The electric motor may be used to propel the vehicle under battery power. The illustrative electric motor includes an output shaft 25, which may be coupled to a vehicle drive system (not shown).

Figure 3:
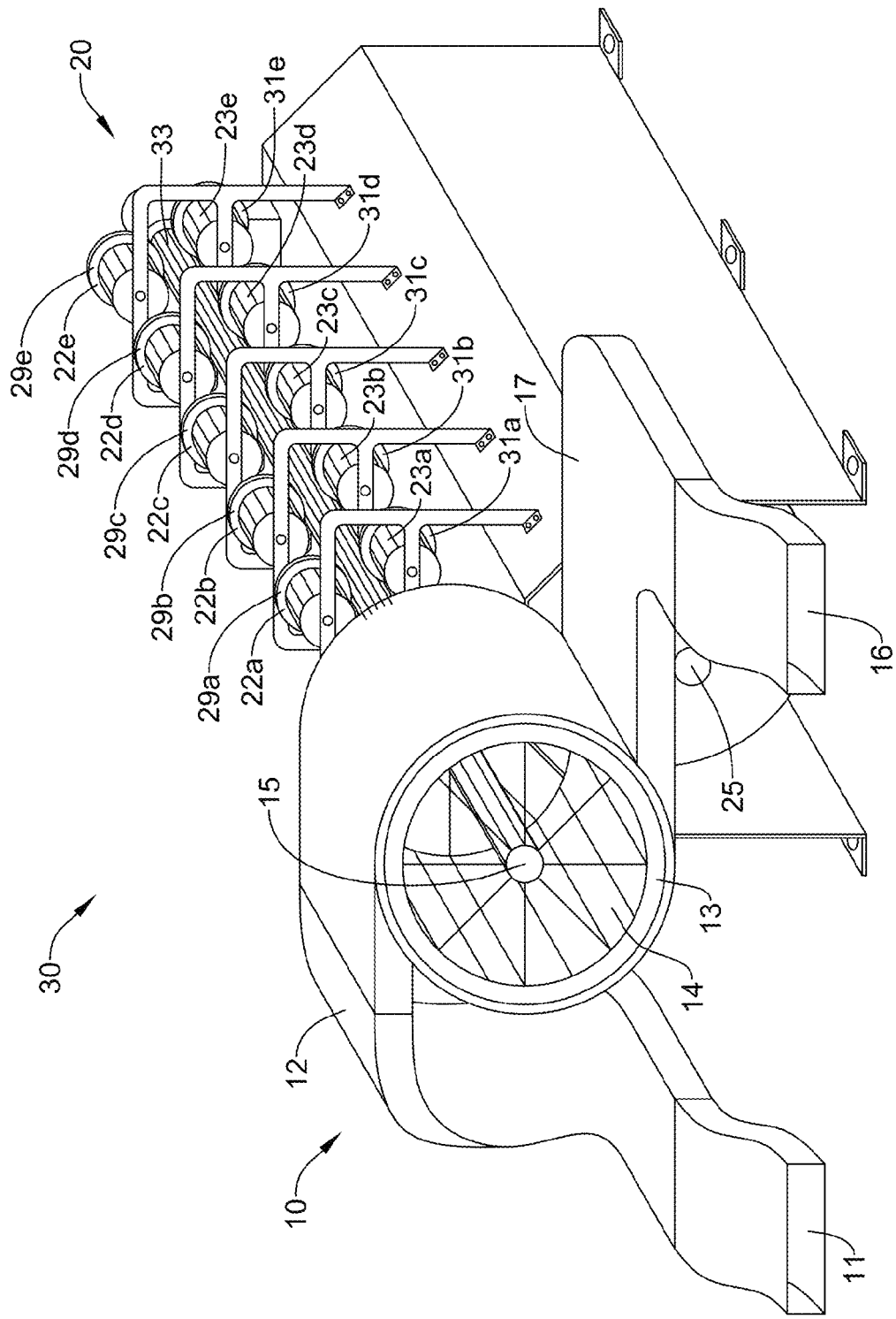
FIG. 3 is a plan drawing of the wind-driven rotation device of FIG. 1 installed with the frame of FIG. 2.

FIG. 3 is a plan drawing of the wind-driven rotation device of FIG. 1 installed with the frame of FIG. 2. Combined, the wind-driven rotation device 10 and the frame 20 form a wind-driven recharging system 30. In the illustrative design shown in FIG. 3, the turbine rotor 13 is directly connected to the rotatable shaft 24, without any intermediate elements. For this illustrative design, the wind-driven rotation device 10 directly rotates the rotatable shaft 24. In this design, the wind-drive rotation device 10 is collinear with the rotatable shaft 24, however, this is not required. More specifically, for this illustrative design, the rotatable shaft 24 is collinear with the center line 15 of the turbine rotor 13. In other designs, the wind-driven rotation device 10 may be rotationally coupled to a belt and/or one or more gears that converts its rotational movement to rotation of the rotatable shaft 24. Using a belt and/or one or more gears may optionally allow a scaling up or scaling down of the relative rotation rates, so that a particular rotation of the turbine rotor 13 may produce more or less rotation of the rotatable shaft 24.

Figure 4:
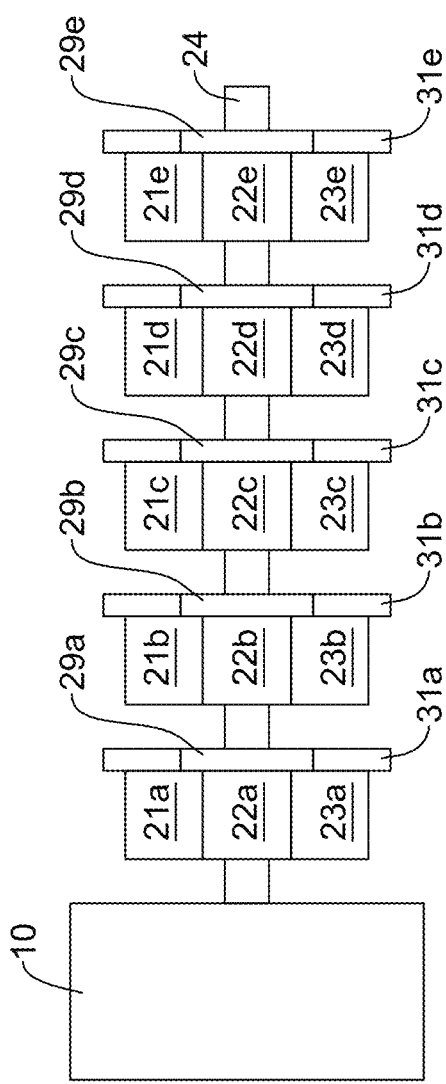
FIG. 4 is a schematic top view of the embodiment shown in FIG. 3.

FIG. 4 is a schematic top view of the embodiment shown in FIG. 3 showing electric generators 21A-E, 22A-E and 23A-E and rotatable shaft 24. In the illustrative embodiment, the electric generators extend over substantially the entire longitudinal length of the rotatable shaft 24, from a proximal end proximate the wind-driven rotation device 10 to a distal end opposite the proximal end. In the illustrative design of FIG. 4, each group of electric generators, 21A-E, 22A-E or 23A-E, is shown regularly spaced along the rotatable shaft 24. Alternatively, the spacing between adjacent electric generators may vary.

Note that each group of electric generators is azimuthally displaced from the other groups. In other words, looking end-on from the point of view of the wind-driven rotation device 10, the groups of electric generators are "spaced out" around the circumference of the rotatable shaft 24. For some designs having two groups of electric generators, the electric generators may be on opposite sides of the rotatable shaft 24. In general, any suitable azimuthal angle may be used, as long as there is room for the electric generators to operate and, in some cases, room to access, repair or replace the electric generators.

In the illustrative design shown in FIG. 4, the two electric generator groups (or subsets) 21A-E and 23A-E are axially coincident. In other words, looking down on the rotatable shaft 24, as in the view of FIG. 4, each electric generator in the group 21A-E couples to the rotatable shaft 24 at the same longitudinal location as the corresponding electric generator in the group 23A-E. Also, in the illustrative design of FIG. 4, the two electric generator groups 21A-E and 22A-E are axially offset from each other. In other words, each electric generator in the group 21A-E couples to the rotatable shaft 24 at a longitudinal location offset from that of the corresponding electric generator in the group 22A-E. Similarly, electric generator groups 23A-E and 22A-E are shown axially offset from each other. In some cases, the axial offsets are the same for all electric generators in the respective groups, but this is not required.

In the illustrative design of FIG. 4, each electric generator group 21A-E, 22A-E and 23A-E is collinear with a line that is parallel to the rotatable shaft 24. Alternatively, the locations of some or all of the electric generators in any group may deviate from a line parallel to the rotatable shaft 24. For instance, the electric generators in a particular group may be staggered about a line, if desired.

Figure 5:
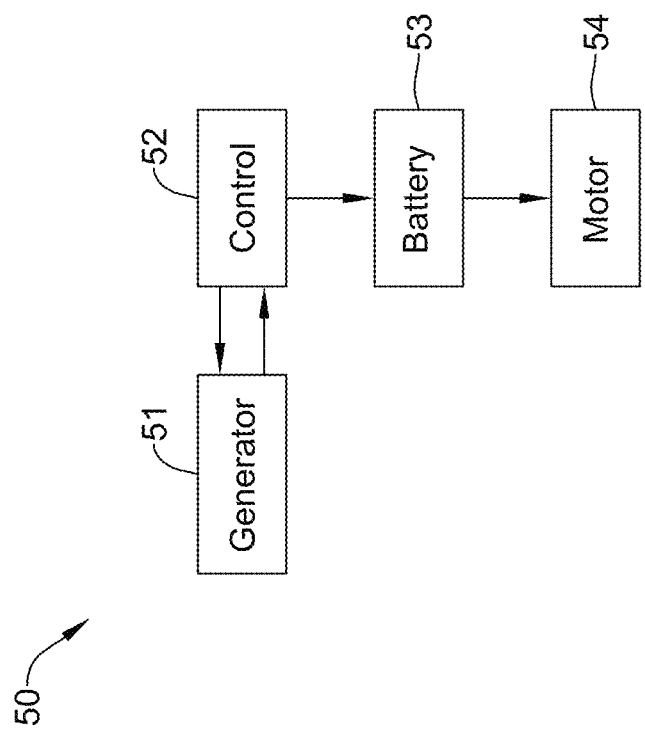
FIG. 5 is a simplified schematic diagram of an illustrative recharging system.

FIG. 5 is a simplified schematic diagram of an illustrative recharging system. The illustrative recharging system 50 includes an electric generator subassembly 51, which is in two-way communication with a controller 52. The controller 52 directs current from the electric generator subassembly 51 to a battery 53, for recharging the battery 53. The battery 53 provides current to an electric motor 54 for propelling the vehicle. In some cases, the battery 53 may provide current for starting a combustion motor, for powering electrical devices in the vehicle such as lights or air conditioning, and/or for directly powering the vehicle, such as for a hybrid vehicle under low-load conditions during which a conventional combustion motor is powered off.

Figure 6:
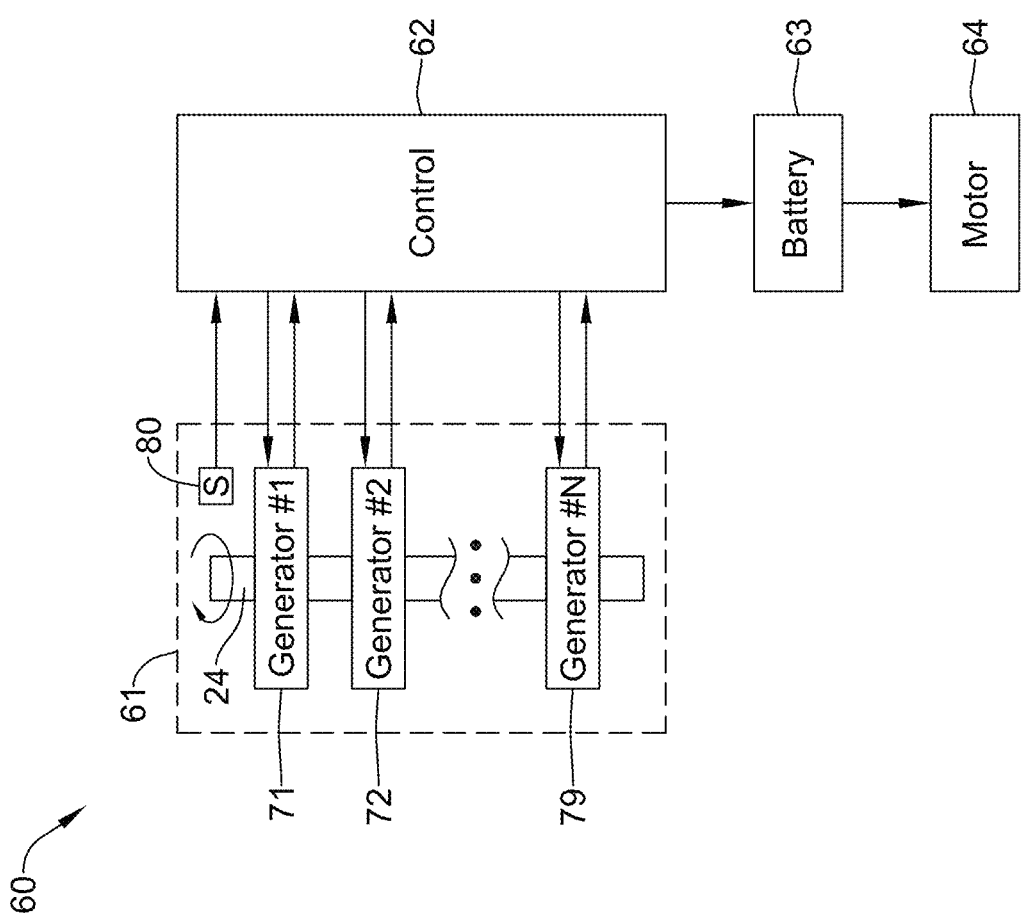
FIG. 6 is a simplified schematic diagram of another illustrative recharging system.
Figure 7:
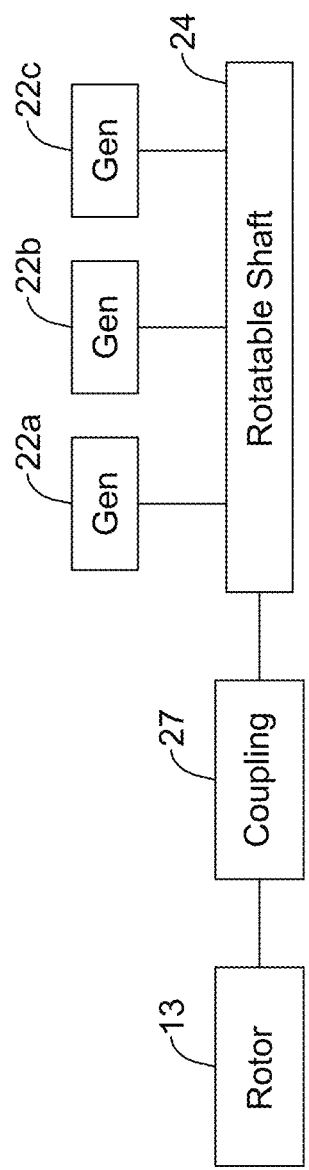
FIG. 7 is a high level schematic block diagram of an illustrative recharging system.
Figure 8:
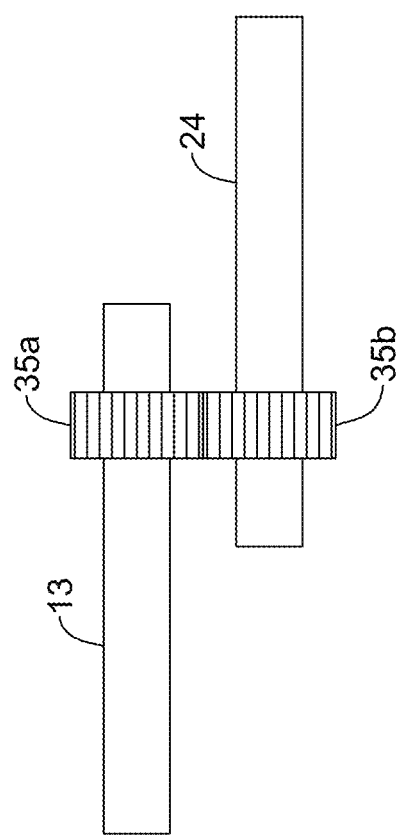
FIG. 8 is a simplified schematic diagram showing an example of the coupling of FIG. 7.

FIG. 6 is a simplified schematic diagram of another illustrative recharging system. In this illustrative embodiment, the recharging system is generally shown at 60 and includes an electric generator subassembly 61, which is in two-way communication with a controller 62. The electric generator subassembly 61 includes a number of electric generators 71, 72, . . . , 79, where electric generator 79 is the "nth" electric generator, where "n" is an integer greater than zero. The "n" electric generator 71, 72, . . . , 79, are all driven by the same rotatable shaft 24, so that they all rotate simultaneously and in synchronization with each other.

The illustrative electric generator subassembly 61 includes a synchronization signal 80, which produces a pulse each time the rotatable shaft 24 rotates past a certain azimuthal location, or produces another suitable electronic marker to denote a particular phase of rotation. For instance, suitable electronic signals may be produced by one or more Hall effect sensors that are adjacent to the rotatable shaft, are connected to the shaft, or rotate along with the rotatable shaft 24. This is just one example sensor. It is contemplated that an optical, magnet or any other type of suitable sensor may be used, as desired, to detect the position and/or rotation speed of the rotatable shaft 24.

The synchronization signal 80 is shown passed to the controller 62, which monitors the synchronization signal 80. The controller 62 can determine, for example, a rotational speed of the rotatable shaft 24 from the number of pulses per unit of time. Alternatively, the rotational speed of the rotatable shaft may be determined as an inverse of the time between adjacent pulses.

In some cases, the controller 62 may determine how much of the electric generator-generated current to pass on to the battery 63. In some cases, the controller 62 may be in two-way communication with the battery 63. For instance, the controller 62 can monitor the load on the battery 63, the voltage produced by the battery 63, and/or the current produced by the battery 63. From one or more of these monitored quantities, the controller 62 may determine when recharging is needed, and may suitably direct current produced by the electric generators 71, 72, . . . , 79 to the battery 63.

In some cases, the controller 62 may limit the amount of current flowing to the battery 63 by dynamically electrically disengaging one or more electric generators 71, 72, . . . , 79 from the output to the battery 63. For instance, if the battery 63 is deemed by the controller 62 to be nearly fully charged, and requires only 20% of the available current from the electric generator subassembly 61 to recharge, the controller may electrically engage only one out of five available electric generators 71, 72, . . . , 79, while keeping the other four in an open circuit thus reducing the load on the rotatable shaft 24. In some cases, such electrical engagement and disengagement may be performed dynamically by the controller 62 as needed.

In some cases, the wind energy may not be sufficient to drive all of the electric generators 71, 72, . . . , 79. For example, when the vehicle is not moving very fast, the wind energy collected by the wind-driven rotation device 10 (see FIG. 1) may only be sufficient to drive one or two of the electric generators 71, 72, . . . , 79. To accommodate this, it is contemplated that the controller 62 may ascertaining a rotation speed of the rotatable shaft 24, and then enable more of the electric generators 71, 72, . . . , 79 to provide electrical recharge current as the speed of rotation of the rotatable shaft 24 increases, and disable more of the plurality of electric generators 71, 72, . . . , 79 to not provide electrical recharge current as the speed of rotation of the rotatable shaft 24 decreases. In some instances, a sufficient number of electric generators 71, 72, . . . , 79 are enabled by the controller 62 to produce a desired, optional or set rotation speed of the rotatable shaft 24.

It should be understood that this disclosure is, in many respects, only illustrative. Changes may be made in details, particularly in matters of shape, size, and arrangement of steps without exceeding the scope of the invention. The invention's scope is, of course, defined in the language in which the appended claims are expressed.

What is claimed is:

1. A wind-driven charging system, comprising:
   a wind-driven rotation device having a rotor;
   a rotatable shaft having a length extending along a rotation axis that extends away from the wind-driven rotation device;
   a coupling for operatively coupling the rotor of the wind-driven rotation device to the rotatable shaft such that, in response to rotation of the rotor of the wind-driven rotation device, the rotatable shaft rotates at a different rotation rate than the rotor of the wind-driven rotation device; and
   at least three electric generators each disposed at a different longitudinal location along the length of the rotatable shaft, and each of the at least three electric generators are rotationally driven simultaneously by the rotatable shaft, and wherein each electric generator includes a wheel having an outer circumference, wherein the outer circumference of the wheel rides along an outer circumferential surface of the rotatable shaft as the rotatable shaft rotates.

2. The wind-driven charging system of claim 1, wherein the outer circumferential surface of the rotatable shaft includes serrations to help reduce slippage between the outer circumference of the wheels of the electric generators and the outer circumferential surface of the rotatable shaft.

3. The wind-driven charging system of claim 1, wherein the at least three electric generators include at least three alternators.

4. The wind-driven charging system of claim 1, wherein the at least three electric generators are regularly spaced along the rotatable shaft.

5. The wind-driven charging system of claim 1, wherein the wind-driven rotation device rotates about an axis that is laterally offset from the rotation axis of the rotatable shaft.

6. The wind-driven charging system of claim 1, wherein the outer circumference of the wheel includes gear teeth, and the outer circumferential surface of the rotatable shaft includes corresponding gear teeth.

7. The wind-driven charging system of claim 1, wherein the coupling includes:
   a first gear mounted to the rotor of the wind-driven rotation device; and
   a second gear mounted to the rotatable shaft, wherein the first gear drives the second gear.

8. The wind-driven charging system of claim 1,
   wherein a first subset of the at least three electric generators is disposed along a first common axis that is substantially parallel to the rotation axis of the rotatable shaft; and
   wherein a second subset of the at least three electric generators are disposed along a second common axis that is substantially parallel to the rotation axis of the rotatable shaft, and wherein the second common axis is substantially parallel to but angularly offset from the first common axis.

9. The wind-driven charging system of claim 8, wherein the second common axis is azimuthally displaced from the first common axis.

10. The wind-driven charging system of claim 8, wherein electric generators in the second subset are axially offset from electric generators in the first subset, the axial offset being the same for all electric generators in the first subset and the second subset.

11. The wind-driven charging system of claim 8,
    wherein the first subset of electric generators are collinear with a first line;
    wherein the second subset of electric generators are collinear with a second line;
    wherein the first line is parallel to the second line; and
    wherein the first and second lines are parallel to the rotation axis of the rotatable shaft.

12. The wind-driven charging system of claim 1, further comprising a controller in two-way electrical communication with the at least three electric generators.

13. The wind-driven charging system of claim 12, further comprising a battery that receives electrical recharging from the at least three electric generators, and wherein the controller controls, at least in part, the electrical recharging of the battery.

14. The wind-driven charging system of claim 13, further comprising an electric motor that receives at least some electrical power from the battery.

15. A drive system having a wind-driven charging system, comprising:
    an electric motor;
    a battery providing at least some current to the electric motor; and
    a controller that receives current from an electric generator subassembly and provides recharging current to the battery;
    the electric generator subassembly comprising:
      a wind-driven rotation device having a rotor;
      a rotatable shaft having a length extending along a rotation axis that extends away from the wind-driven rotation device;
      a coupling for operatively coupling the rotor of the wind-driven rotation device to the rotatable shaft such that, in response to rotation of the rotor of the wind-driven rotation device, the rotatable shaft rotates at a different rotation rate than the rotor of the wind-driven rotation device; and
      a first plurality of electric generators operatively coupled to the rotatable shaft and disposed at different longitudinal locations along the length of the rotatable shaft, and wherein each of the plurality of electric generators includes a wheel having an outer circumference, wherein the outer circumference of the wheel rides along an outer circumferential surface of the rotatable shaft as the rotatable shaft rotates.

16. The drive system of claim 15, wherein the controller dynamically electrically engages a selected non-zero number of the plurality of electric generators from two or more non-zero numbers, and electrically disengages the remainder of the plurality of electric generators, wherein the selected non-zero number is dependent upon at least one dynamically monitored parameter.

17. The drive system of claim 16, wherein the at least one dynamically monitored parameter comprises a voltage of the battery.

18. The drive system of claim 16, wherein the at least one dynamically monitored parameter comprises a measure related to a speed of rotation of the rotatable shaft.

19. A method for recharging a battery, comprising:
exposing a wind driven rotation device to wind;
rotating the wind driven rotation device in response to the wind;
rotating a rotatable shaft that is coupled to the rotation device, wherein the rotatable shaft has a length that extends away from a first side of the wind-driven rotation device, wherein the rotatable shaft rotates at a different rotation rate than the wind-driven rotation device;
rotating a plurality of electric generators disposed along the length of the rotatable shaft that extends away from the first side of the wind-driven rotation device, each of the plurality of electric generators includes a wheel having an outer circumference, wherein the outer circumference of the wheel rides along an outer circumferential surface of the rotatable shaft as the rotatable shaft rotates; and
providing an electrical current generated by the plurality of electric generators;
to the battery.

20. The method of claim 19, further comprising:
ascertaining a measure related to a speed of rotation of the rotatable shaft;
with one or more of the electric generators enabled, enabling one or more additional of the plurality of electric generators to provide electrical current when the speed of rotation of the rotatable shaft increases; and
with one or more of the electric generators enabled, disabling less than all of the electric generators when the speed of rotation of the rotatable shaft decreases.

* * * * *